United States Patent
Cornelissen et al.

(10) Patent No.: US 6,437,900 B1
(45) Date of Patent: Aug. 20, 2002

(54) TRANSFLECTIVE DISPLAY DEVICE

(75) Inventors: Hugo J. Cornelissen; Martin Ouwerkerk; Peter A. Duine, all of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/552,654

(22) Filed: Apr. 19, 2000

(30) Foreign Application Priority Data

Apr. 20, 1999 (EP) .............................. 99201213

(51) Int. Cl.$^7$ ........................ G02F 1/03; G02F 1/1335
(52) U.S. Cl. .................. 359/246; 359/247; 359/251; 359/253; 359/486; 359/487; 349/62; 349/96
(58) Field of Search .................... 359/246, 242, 359/608, 275, 247, 251, 252, 253, 486, 487; 349/62, 63, 64, 96

(56) References Cited

U.S. PATENT DOCUMENTS

| | | | |
|---|---|---|---|
| 5,652,433 A | | 7/1997 | Ouwerkerk et al. ............ 257/1 |
| 5,686,979 A | * | 11/1997 | Weber et al. .................. 349/96 |
| 5,905,590 A | | 5/1999 | Van Der Sluis et al. ..... 359/275 |
| 5,973,817 A | * | 10/1999 | Robinson et al. ............ 359/247 |
| 6,124,905 A | * | 9/2000 | Iijima ........................... 349/62 |
| 6,124,971 A | * | 9/2000 | Ouderkirk et al. ........... 359/487 |

FOREIGN PATENT DOCUMENTS

WO WO9701789 1/1997 ......... G02F/1/1335

* cited by examiner

*Primary Examiner*—Loha Ben
(74) *Attorney, Agent, or Firm*—Aaron Waxler

(57) ABSTRACT

Transflective display device having a transflector (10) which is switchable between a transparent state and a mirror-like state. Preferably, a metal hydride optical switch is used as the transflector.

9 Claims, 1 Drawing Sheet

TRANSFLECTIVE DISPLAY DEVICE

BACKGROUND OF THE INVENTION

The invention relates to a transflective display device comprising an electro-optical material between a first transparent substrate and a second transparent substrate, with an illumination device on the side of the second substrate.

Such display devices, notably liquid crystal display devices, find an increasingly wider application in, for example, portable telephones, automotive uses, etc.

A transflective display device usually comprises a transflector which, when used in transmission (referred to as the "night view mode") partly transmits light from a backlight placed behind the display device or, when used in reflection (referred to as the "daytime view mode") reflects incident light.

In the common transflectors, the reflection is approximately 65% of the incident light, while only approximately 35% of the light from the backlight is passed by the transflector. This is at the expense of the brightness, unless a brighter light source is chosen, which requires extra energy and reduces the lifetime of the battery. An increase of the transmission in the "night view mode" is at the expense of brightness and contrast in the "daytime view mode".

SUMMARY OF THE INVENTION

It is, inter alia, an object of the invention to find a solution to the above-mentioned problem. To this end, a transflective display device according to the invention is characterized in that a switchable mirror is arranged between the illumination device and the electro-optical material, which mirror is switchable between a transparent state and a state reflecting light in the direction of the layer of electro-optical material.

A first embodiment of a transflective display device according to the invention is characterized in that the mirror is provided with a switchable layer comprising a trivalent metal which can form a hydride with hydrogen, and the switchable layer is reversibly switchable between a reflecting state and a transparent state by exchange of hydrogen.

The switchable layer preferably also comprises magnesium which can form hydrides. It has been found that a reflection of at least 75% and, in some cases, of 85% to 90% is realized with such layers, while these layers are switchable (within 1 to 10 sec) to a transparent state in which 80% to 90% of the light is transmitted. If necessary, the switchable layer is provided with a catalytically active layer comprising at least one metal of the group of palladium, platinum, cobalt and nickel.

A second embodiment of a transflective display device according to the invention is characterized in that the switchable layer is in contact with a liquid electrolyte, a gel electrolyte or a solid-state electrolyte. Examples are 1 molar KOH in water, 1 molar trifluoroacetic acid in symmetric collidine and cerium oxide ($CeO_2$).

A particularly advantageous embodiment causes the switchable mirror and the illumination device to switch in a coupled way (for example, simultaneously).

These and other aspects of the invention are apparent from and will be elucidated with reference to the embodiments described hereinafter.

BRIEF DESCRIPTION OF THE DRAWING

FIGS. 1 and 2 show a display device according to the invention in different states, while

The Figures are diagrammatic and not drawn to scale; corresponding components are generally denoted by the same reference numerals.

DETAILED DESCRIPTION OF THE PREFERRED EMBODIMENTS

Figure 1:
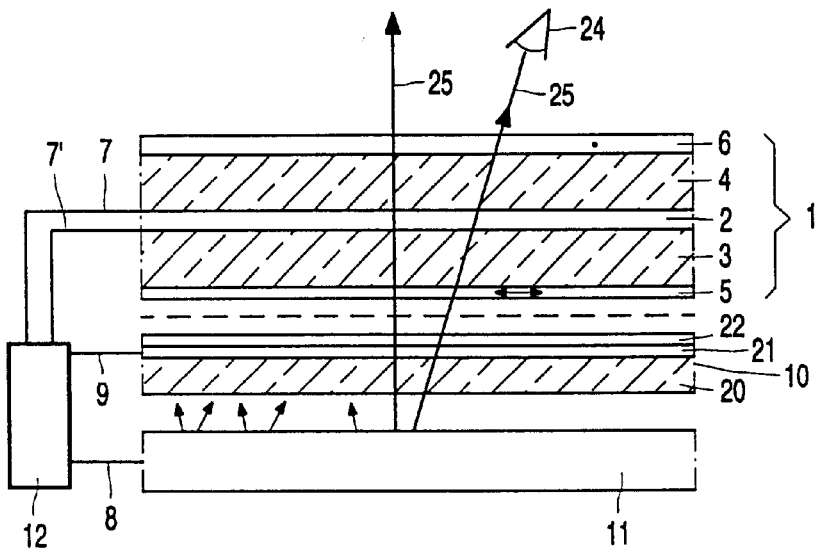
Figure 2:
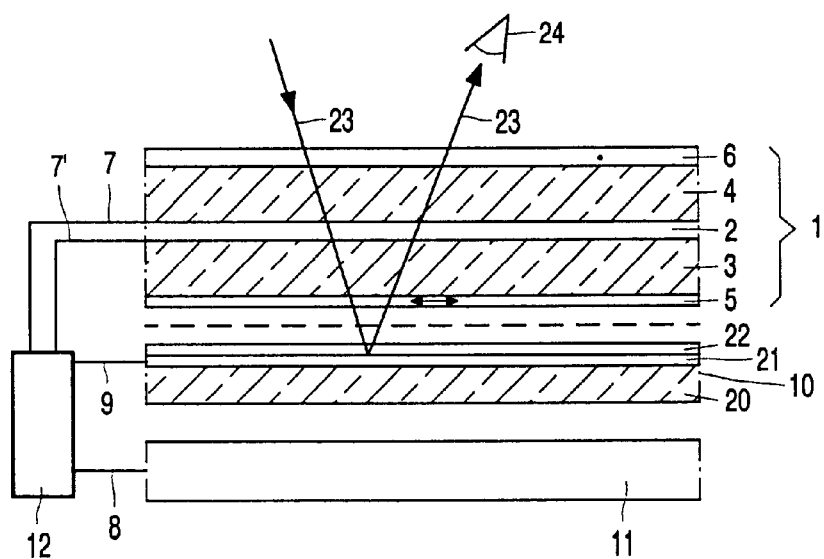

FIGS. 1 and 2 are diagrammatic cross-sections of a part of a display device, a liquid crystal display device in this embodiment, comprising a liquid crystal cell 1 with, in this embodiment, a twisted nematic liquid crystal material 2 which is present between two transparent substrates 3, 4 of, for example, glass, provided with electrodes (not shown). The device further comprises polarizers 5, 6 whose direction of polarization is, for example, mutually crossed perpendicularly. The device also comprises orientation layers (not shown) which orient the liquid crystal material on the inner walls of the substrates, in this embodiment in such a way that the cell has a twist angle of 90 degrees. In this case, the liquid crystal material has a positive optical anisotropy and a positive dielectric anisotropy. The cell 1 is bounded by a cell wall (not shown) or sealing edge.

Transparent electrodes (likewise not shown) of, for example, ITO (indium tin oxide) which cross each other in this embodiment and define pixels at the area of the crossings must be supplied with drive voltages. In the embodiment of FIG. 1, the electrodes are supplied with drive voltages by means of a drive circuit 12 via drive lines 7, 7' shown diagrammatically. The device of FIG. 1 also comprises an illumination source 11 which is driven by the drive circuit 12 via drive lines 8, 8' shown diagrammatically.

According to the invention, the switchable mirror 10 is present between the illumination source 11 and the liquid crystal cell 1. In its simplest embodiment, the mirror 10 comprises a transparent substrate 20 of, for example, quartz glass, a switchable layer 21 of one of the metals Y or Gd, in this embodiment Gd, which in turn is coated with a thin palladium layer 22 (of approximately 5 nm). Such a switchable layer is described in greater detail in U.S. Pat. No. 5,652,433. As described in this patent, the layer ($GdH_2$) has a mirror-like surface after manufacture and is not transparent. Incident light 23 (FIG. 2) which is passed by the display device 1 is reflected on the mirror 10 and observed by a viewer 24. When exposing the layer 21 to hydrogen, it changes into a light-transmissive layer ($GdH_3$). Light beams 25 from the illumination source 11 now pass the mirror 10 and reach the viewer 24. Said passage is reversible by exchange of hydrogen.

Atomic hydrogen may be added to the layer 21 in various manners, for example, from the gas phase or by means of electrochemical generation. However, use is preferably made of an electrically switchable layer. In this embodiment, the illumination source 11 is switched on via drive lines 8 simultaneously when the mirror is rendered transparent via drive lines 9. Simultaneously when the mirror is made non-transparent via drive lines 9, 9', the illumination source 11 is switched off via drive lines 8, 8'.

Figure 3:
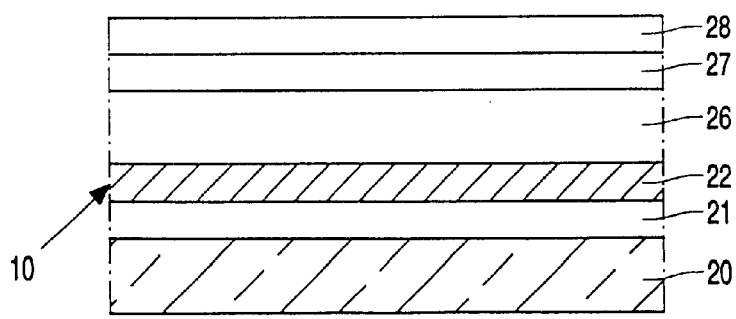
FIG. 3 shows a variant of the switchable layer.

Such an electrically switchable mirror 10 is shown in FIG. 3. It comprises a transparent (glass) substrate 20, a first electrode of $Gd_{0.4}Mg_{0.6}H_x$ ($0.8 < x < 2.4$) as a switching layer 21 having a thickness of about 200 nm (in this embodiment), a palladium layer 22 having a thickness of about 5 nm (in this embodiment), a thick layer 26 of a solid-state electrolyte $Ta_2O_5 \cdot nH_2O$, a second electrode 27 of transparent $H_xWO_3$ ($0 < x < 0.5$) having a thickness of about 350 nm (in this embodiment), and a conducting transparent ITO layer 28.

All layers are transparent, while layer 21 is switchable between a reflecting state and a transparent state.

The stack of layers in FIG. 3 functions as follows. The layers 21 and 28 are connected to an external current source (for example, incorporated in the drive unit 12). By using a cathodic DC current on the first electrode 21, the low-hydrogen containing, mirror-like composition is converted into a transparent high-hydrogen containing composition. $H_xWO_3$ of the second electrode 27 is then simultaneously converted into transparent $WO_3$. The mirror 10 is now transparent. When reversing the current, the first state is reached again. Switching times are of the order of 1 to 10 sec for switching to the transparent state. Switching to the reflective state takes longer but is sufficiently rapid for the customary applications.

For a further description of other embodiments of the mirror of FIG. 3 and materials suitable for this mirror (for example, the use of platinum, cobalt or nickel instead of palladium, several suitable hydrogen conductors, materials for the switchable layer, etc.) reference is made to U.S. Pat. No. 5,905,590.

In a display device as shown in FIGS. 1, 2, with a mirror as shown in FIG. 3, reflection values of 80 to 90% were reached. The mirror has a transmission of at least 40% but this may increase to 80 to 90%, notably when the palladium layer is omitted.

The invention is of course not limited to the embodiments shown. As described, various other materials are possible for the switchable mirror such as a liquid electrolyte (for example, 1 molar KOH in water), a gel electrolyte (for example, 1 molar trifluoroacetic acid in symmetric collidine) or a solid-state electrolyte (for example, cerium oxide ($CeO_2$)). Also completely different switching mechanisms than those with a current source are not excluded. Moreover, mirrors are feasible which do not switch in accordance with the mechanism of hydrogen exchange, for example, a switchable tin layer. Instead of a liquid crystal effect, a different electro-optical effect such as an electrophoretic effect may be used for the display device.

In summary, the invention relates to a display device of the transflective type, in which the transflector comprises a layer which is switchable between a transmissive and a reflective state.

The invention resides in each and every novel characteristic feature and each and every novel combination of characteristic features.

What is claimed is:

1. A transflective display device comprising an electro-optical material between a first transparent substrate and a second transparent substrate, with an illumination device on the side of the second substrate, characterized in that a switchable mirror is arranged between the illumination device and the electro-optical material, which mirror is switchable between a transparent state and a state reflecting light in the direction of the electro-optical material.

2. A transflective display device as claimed in claim 1, characterized in that the switchable mirror in the transparent state transmits at least 40% of the light.

3. A transflective display device as claimed in claim 1, characterized in that the switchable mirror is provided with a switchable layer comprising a trivalent metal which can form a hydride with hydrogen, and the layer is reversibly switchable between a reflecting state and a transparent state by exchange of hydrogen.

4. A transflective display device as claimed in claim 3, characterized in that the switchable layer also comprises magnesium.

5. A transflective display device as claimed in claim 4, characterized in that the switchable mirror in the transparent state transmits at least 65% of the light.

6. A transflective display device as claimed in claim 3, characterized in that the switchable layer is provided with a catalytically active layer comprising at least one metal of the group of palladium, platinum, cobalt and nickel.

7. A transflective display device as claimed in claim 1, characterized in that the electro-optical material comprises liquid crystalline material.

8. A transflective display device as claimed in claim 1, characterized in that the display device and the illumination device comprise means for coupling the switching of the switchable layer with the switching of the illumination device.

9. A transflective display device as claimed in claim 1, wherein the switchable mirror further comprises a transparent substrate, a first electrode, a layer of Pd, a layer of solid-state electrolyte, a second electrode, and a conducting transparent layer.

* * * * *